United States Patent [19]

Koivikko

[11] Patent Number: 5,027,023

[45] Date of Patent: Jun. 25, 1991

[54] ELECTRIC MOTOR INCLUDING REDUCTION-GEAR AND CIRCUIT

[76] Inventor: Heikki T. Koivikko, Petaksentie 18, SF-00630 Helsinki, Finland

[21] Appl. No.: 435,366

[22] PCT Filed: Apr. 15, 1988

[86] PCT No.: PCT/FI88/00055
§ 371 Date: Nov. 8, 1989
§ 102(e) Date: Nov. 8, 1989

[87] PCT Pub. No.: WO88/09079
PCT Pub. Date: Nov. 17, 1988

[30] Foreign Application Priority Data

May 11, 1987 [FI] Finland .................. 872070
Feb. 2, 1988 [FI] Finland .................. 880477

[51] Int. Cl.⁵ .................. H02K 5/173; F16H 13/06
[52] U.S. Cl. .................. 310/83; 310/90; 384/514; 475/196
[58] Field of Search .................. 74/196, 421 R; 310/67 R, 83, 89, 90; 384/514; 475/189, 196, 317

[56] References Cited

U.S. PATENT DOCUMENTS

| 2,101,594 | 12/1937 | Pensbee ................. 475/196 |
| 4,617,838 | 10/1986 | Anderson . |
| 4,918,344 | 4/1990 | Chikamori et al. ........ 310/83 |
| 4,928,543 | 5/1990 | Johannesen et al. ....... 475/196 |

FOREIGN PATENT DOCUMENTS

| 60-53666 | 3/1985 | Japan . |
| 60-222653 | 11/1985 | Japan ................. 310/90 |
| 2167608 | 5/1985 | United Kingdom . |

Primary Examiner—Steven L. Stephan
Assistant Examiner—D. L. Rebsch
Attorney, Agent, or Firm—Spensley Horn Jubas & Lubitz

[57] ABSTRACT

The reduction gear (6) is fastened to the body (1) of an electric motor including a gear, and the motor stator is fastened to the removable electronics part (13) of the body. The motor rotor (7) is connected to the gear with an input shaft (15), the output shaft (20) extending concentrically through the input shaft. The output shaft (20) is carried in bearings (3, 4) essentially near the end faces of the housing (1, 13). One end of the output shaft constitutes a flange-shaped cover (2) of the gear, the flange being carried in a bearing (3) close to the outer periphery of the housing. The gear can be realized as a friction gear with several stages.

10 Claims, 3 Drawing Sheets

ELECTRIC MOTOR INCLUDING REDUCTION-GEAR AND CIRCUIT

This invention relates to a mechanical actuator and more specifically to an electric motor including a gear.

Electric motors and gears and combinations of them are frequently used as continuous drives, as well as actuators controlling the number of revolutions and the turning angle of an axis. The combination includes in this case also a number of sensors and control circuits.

The combinations known are assembled of generally available parts, such as dc- or ac-motors, various gearing and sensor units and units of control circuitry. The combinations include many bearings, shaft joints, various fitting joints and, cabling between units. Therefore using these kinds of combinations presents recurrent problems to their designers, especially because of the varying fixing means and measures. This also leads to difficulties in designing and mounting devices and machinery where these kinds of combinations are included. Moreover, the complicated design of prior art machinery leads frequently to complex implementations, when a rigid construction is desired. Therefore it is cumbersome and time consuming to use and service these kinds of devices, and in a process industry, this will lead to an essential burden on the profitability.

In the Finish patent No. 26230 a combination of a motor and a gear is described, where the gearing part may be exchanged in order to change the gear ratio. The device to be driven is connected to the shaft on the motor side. It is an object of the present invention to provide an improved and simpler construction unit including a motor and a reduction gear, the combination having a firm structure, allowing easy service and being suitable for numerous operating conditions.

According to the invention, a motor and a gear each known as such are combined in accordance with the characterizing part of claim 1.

The gear may for instance be a commercially available planet gear or friction gear, and due to the hollow input shaft it is possible to direct the output shaft through the input shaft. The output shaft is preferably carried in bearings at the ends of the box-like housing, and moreover in such a way that the other end of the shaft will form a flange-shaped cover of the gearing. Preferably the electric motor with the gear is built into a cylindrical housing concentrically with the shafts, although other shapes of the housing are possible.

The essential features of the invention are described in more detail in the claims. Preferred embodiments of the invention are described below with reference to the accompanying drawing, where:

Figure 1:
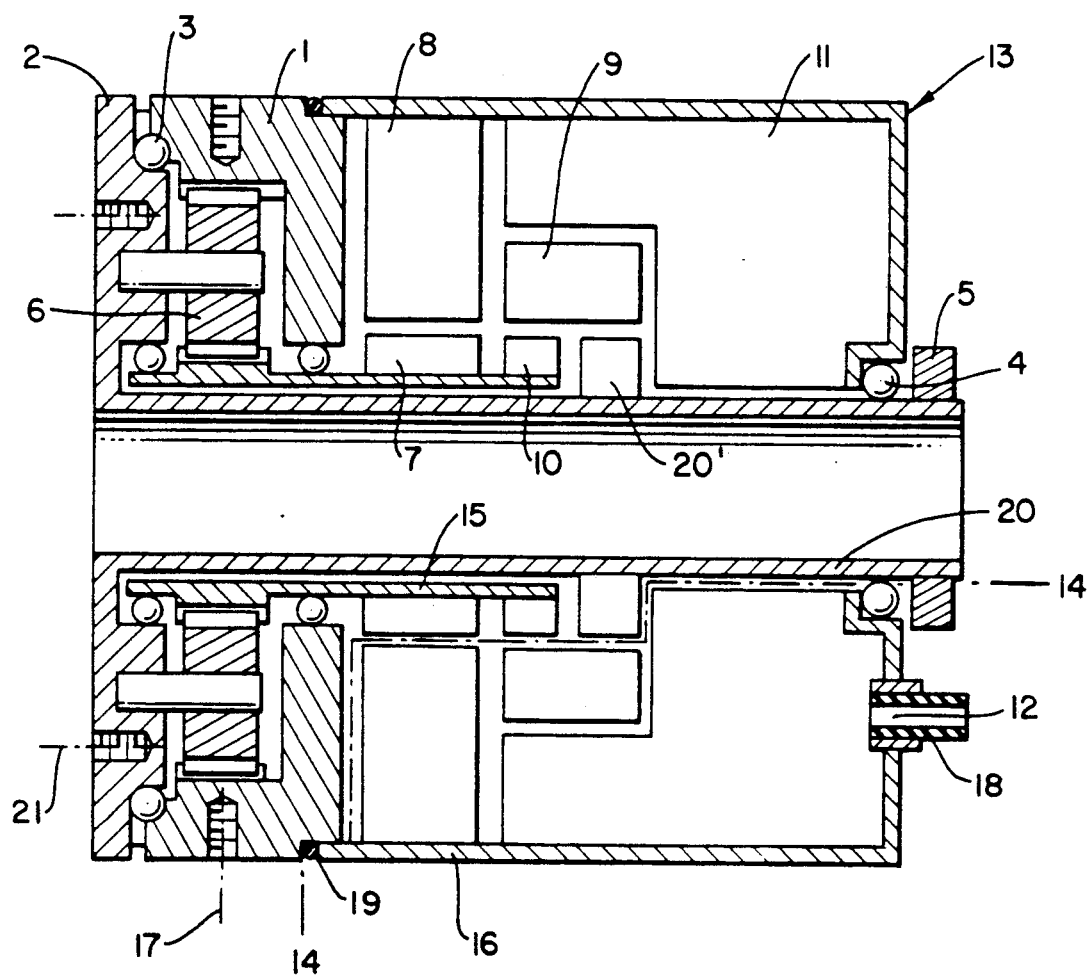
FIG. 1 shows schematically a cross-section of a preferred embodiment of the electric motor including gear of the present invention.

In FIG. 1 the fixed part 1 of the housing is fastened to the construction which supports the electric motor, including the gear, by retentions 17 on the periphery, which may be, e.g., screws. The fixed part of the gear is secured to the fixed part of the housing 1, and the output side of the gear is connected to the output flange 2 of the output shaft 20, the parts driven by the electric motor/gear being fastened (21) to the flange 2. The flange 2 is preferably made in one piece with the shaft 20.

The input shaft 15 is rotated by the rotor 7 of the motor, the rotor being secured to the shaft, the stator of the motor being secured to the removable part 13 of the housing. The input shaft 15 is carried in bearings of the housing 1 and of the flange-shaped cover 2 of the gearing. In order to provide the output shaft with a good stability, the output shaft is carried in bearing 3 of the end-flange near the periphery, and at the other end in bearing 4. To the removable part 13 of the housing is secured the stator 8 of the motor, sensors 9 and circuits 11 for control and operation according to the needs. Suitably the motor is a dc-motor, whose rotational direction and the amount as well as the rate of rotational movement is controlled by circuits 11, according to a signal coming via, e.g., a control cable. The part 13 is tightened against the bearing 4 by a nut 5 threaded on the output shaft, the parts of the housing abutting, e.g., on the periphery along points 16. The connecting cables for the electric supply of the motor, as well as for the sensors and control circuits, are brought into the body through inlets 12.

The removable electronics part 13 of the body is removed for service or other purposes by unfastening the nut 5, it then being possible in a simple way to lift out the entire part 13 including its interior parts along the separating surface 14—14. In order to facilitate the removing process, the cables are equipped with suitable connectors. The rotor 7 of the motor, the sensor rotors 10, the bearing 3 and the reduction gear 6 will not be removed when the part 13 is removed or possibly exchanged.

It is suitable to fix the sensor rotors 10 and 20' to the input and output shafts, thereby providing via the sensors 9 information to control the rotational speed, number of revolutions, rotational direction, angle of rotation, or related quantities. The sensors are of a type commercially available, or specially designed sensors for this purpose. Because the sensors can be mounted on both the input and the output shafts, it is possible to monitor and control the operation of the motor and of the gear in multiple ways.

When a long distance between the bearings is desired, the removable part 13 of the body will be spacious, thereby providing room for the control of the motor, e.g. for the power supply of the motor, and for other useful regulating devices, which are assembled from commercially available parts and/or made from parts specially designed for this purpose.

The electric motor/gear described above may further be equipped with fluid-tight bearings 3, 4, and with a fluid-tight gasket 19 between the parts of the housing. The inlet 12 is also equipped with a fluid-tight packing 18. In this construction the whole interior of the body is filled with a suitable fluid, e.g. with water-propyleneglycol-solution, whereby it is possible through the combined effect of the fluid and the gaskets to put the electric motor/gear in water or in an environment containing, e.g., fretting gases. Alternatively only a part of the body is filled with the fluid.

Figure 2:
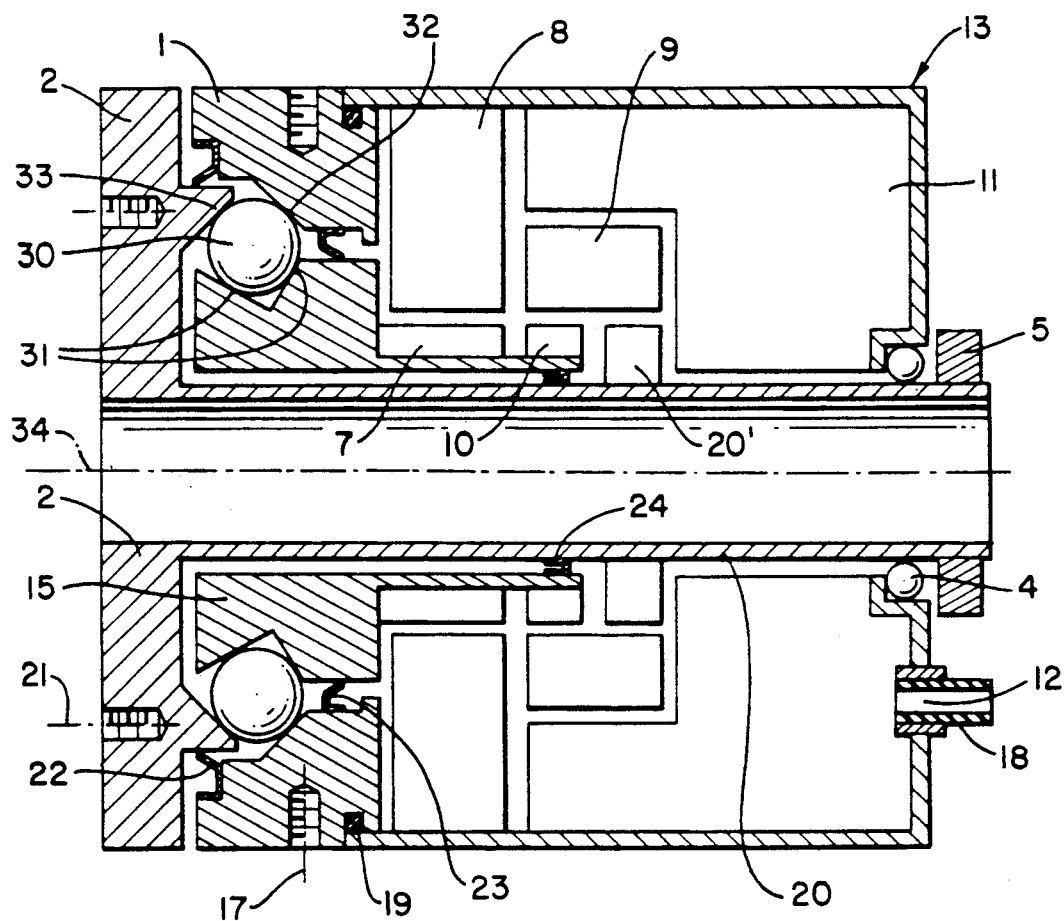
FIG. 2, shows another embodiment of the invention.

Another advantageous embodiment of the electric motor including gear is presented in FIG. 2. The same reference numerals have been used for similar parts as were used in FIG. 1. The essential difference is the fact that the reduction gear constitutes a friction gear 30 realized with balls. A friction gear of this type is as such known through the Finish Patent No. 7136. In the present invention the balls 30 are disposed at a uniform distance from each other along a roller face arranged for them. The balls 30 constitute the bearing corresponding to the bearing 3 in FIG. 1. Further they constitute the gear 6. The balls abut two faces 31 in the groove arranged in the rotor, a face 32 in the housing 1, and a face 33 in the output flange. When the motor is running, the faces 31, 32, 33 in the cross-section of FIG. 2 form a circular path. The ratio of the gear is defined by the distances of the faces 31, 32, 33 to the axis 34 of the shaft, and by the interrelations between these distances.

When required, the gearing part may be sealed by gaskets 22, 23 and 24. The gear may also be run in a dry condition and then no sealing is necessary.

It may be difficult to achieve a predetermined gear ratio with a friction gear of this kind, partly because of the tolerances in manufacture of the parts and partly because of the wear of the parts during operation. However, the variation of the gear ratio during operation presents no problem, because the electric motor/gear according to the invention is controlled by information from the sensors 10, 20' and 9. The control electronics 11 may constitute a feedback system, with which the rotational angle or number of revolutions of the output shaft 20 can be exactly controlled, independent of variations in the gear ratio.

On the other hand, the variation in the gear ratio sensed by the sensors 9, 10, 20', can be utilized in long-term operation to monitor the electric motor/gear, and, e.g., to regulate the clearance of the bearings.

When the material of the balls and of the abutting faces is selected and dimensioned in a suitable way, the variations mentioned above may be essentially completely avoided.

Figure 3:
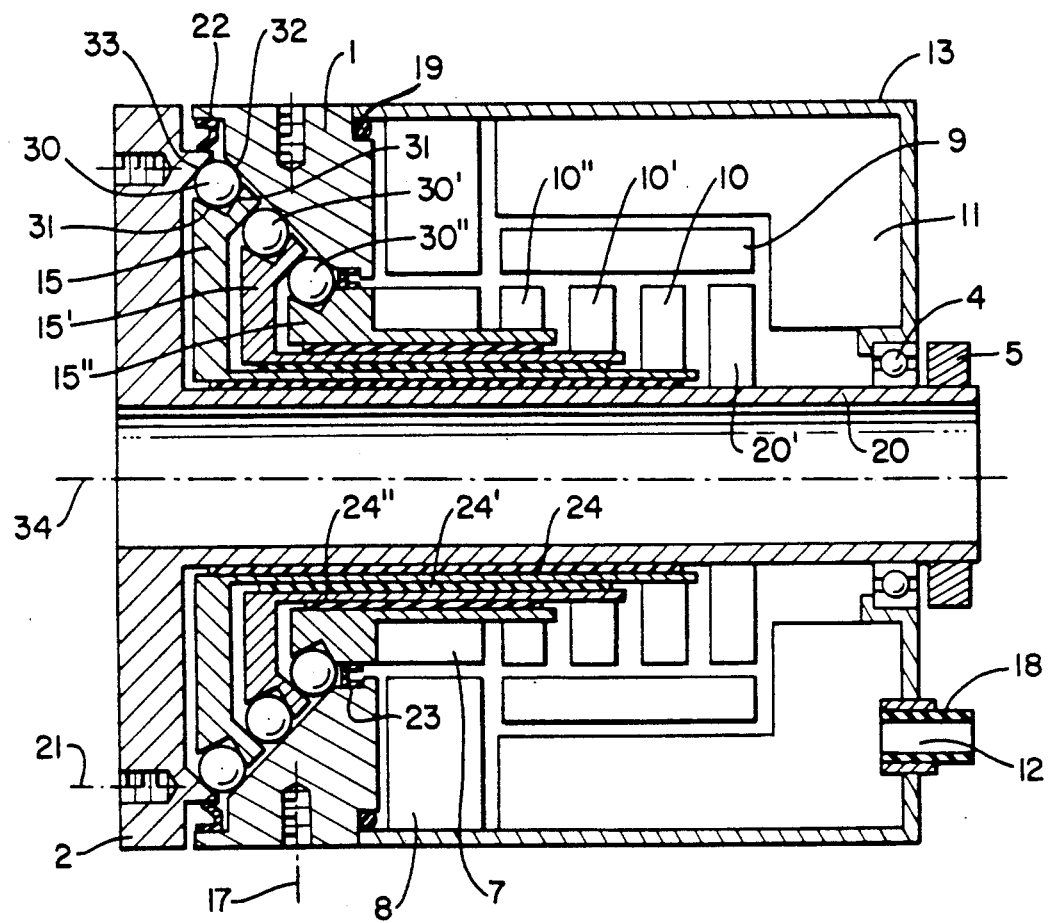
FIG. 3 is a further developed electric motor including gear, including a triple gear.

Referring to FIG. 3, there is utilized the same friction bearing structure as in FIG. 2, but as an example in three stages. There could, however, be utilized two, four, five etc. stages. The same reference numerals are used to denote the same parts as in FIG. 2.

The balls in the different stages of the gear have reference numerals 30, 30' and 30". Correspondingly, the input shafts of the gear stages have numerals 15, 15' and 15", and their gaskets numerals 24, 24' and 24".

Each gear stage can have a gear ratio defined by the radius of its abutting faces. In this embodiment the gear ratios may be 16:1 each, thereby giving the gearing a total gear ratio of 4096:1.

The input and output shafts of each stage can be equipped with sensor rotors 10, 10' and 10", 20', whereby the above mentioned controlling and monitoring functions can be realized with e.g. a feedback circuit.

The electric motor/gear of the invention could suitably be equipped with a hollow output shaft 20 as shown in the figure. Depending on the application, axial supporting structures, rotating shafts, electric cables and pipes, and pipes for fluids and gas may then be directed through the body of the unit, either as functional parts of the device or devices to be driven by the electric motor/gear, or as independent units.

When a part with internal threading is attached to the other end of the hollow output shaft 20, the rotating movement of the electric motor/gear can be transformed into an axial movement of a spindle, which is not shown.

The rotational movement governed by sensors 9, 10, 20' and the controlling electronics can be exactly limited, even to fractions of a revolution, or extended to a continuous rotational movement with controlled speed. Due to the gear ratio of the reduction gear and the pitch of the said screw thread, the spindle moving in the hollow shaft can have an exactly controlled motion with a setting accuracy better than 0.01 mm even with a single-stage gear.

The electric motor including gear may thus be used as an actuator, both for rotational and axial movement, the gear ratio being selectable between 5:1 and 10,000:1.

I claim:
1. Electric motor including gear comprising:
a housing including a fixed part (1) and a removable end part (13) coupled to the fixed part;
a reduction gear mechanism (6) having a fixed portion being secured to the fixed part (1) of the housing;
a motor stator secured to the interior of the removable end part (13) of the housing;
at least one hollow input shaft (15) provided within the motor stator and coupled to the reduction gear mechanism;
a motor rotor (7) secured to the gear with the input shaft (15);
an output shaft (20) provided within the motor stator and extending concentrically through the input shaft;
the output shaft having at one end thereof a flange engaging the reduction gear mechanism and covering a space within the housing enclosing the reduction gear mechanism;
first bearing means provided near the end faces of the housing for carrying the output shaft; and
second bearing means provided adjacent to the outer periphery of the housing for carrying the flange.

2. Electric motor including gear according to claim 1, wherein the reduction gear mechanism includes a friction gear mechanism which includes balls (30), the balls (30) also adapted for providing a bearing support for the flange-shaped cover (2).

3. Electric motor including gear according to claim 1, wherein the reduction gear mechanism includes a plurality of stages of coaxial friction gears which include balls (30, 30', 30") coaxially arranged around the output shaft, and wherein the corresponding number of plurality of input shafts are each coupled to each stage of coaxial friction gear mechanisms, said balls also adapted for providing a bearing support for the flange-shaped cover.

4. The electric motor according to claim 1 further comprising sensor means adapted for monitoring the revolutions of the input shaft and the output shaft, said sensor means including a first sensor part attached to the removable end part and second rotor sensor parts each secured to the input shaft and the output shaft, and electronic control circuits attached to the removable end part responsive to signals provided by the sensors for controlling the revolution of at least the output shaft, wherein the first sensor part of the sensor means and the electronic control circuits are arranged around the input and output shafts and contained within the removable end part of the housing.

5. Electric motor including gear according to claim 3, characterized in that said output shaft comprises a member with an internal threading attached thereto and a spindle engaging said internal threading and extending into the output shaft, by means of which the rotational movement of said output shaft (20) is transformed into an axially directed movement of the spindle.

6. Electric motor according to claim 1 further including a gasket provided at the joint between the fixed part and the removable end part and wherein the first bearing means and the second bearing means are fluid-tight, whereby the housing is completely or partially filled with a fluid.

7. The electric motor according to claim 3 further comprising sensor means adapted for monitoring the revolutions of the input shaft and output shafts, said sensor means including a first sensor part attached to the removable end part and second rotor sensor parts each secured to each of the input shafts, and electronic control circuits attached to the removable end part responsive to signals provided by the sensors for controlling at least the revolution of the output shaft, wherein the first sensor part of the sensor means and the electronic control circuits are arranged around the input and output shafts and contained within the removable end part of the housing.

8. Electric motor including gear according to 7 wherein the closed housing is fluid-tight, whereby the closed housing is completely or partially filled with a fluid.

9. Electric motor including gear according to claim 4 wherein the closed housing is fluid-tight, wherein the whole interior of the closed housing is completely or partially filled with a fluid.

10. Electric motor according to claim 1 further comprising fastening means provided on the output shaft for maintaining the removable end part in place.

* * * * *